UNITED STATES PATENT OFFICE.

ALEXANDER McKECHNIE, OF BIRMINGHAM, AND FREDRIC GEORGE BEASLEY, OF SMETHWICK, NEAR BIRMINGHAM, ENGLAND.

METHOD OF SEPARATING METALLIC COMPOUNDS.

981,451.      Specification of Letters Patent.    Patented Jan. 10, 1911.
No Drawing.      Application filed July 22, 1910. Serial No. 573,274.

*To all whom it may concern:*

Be it known that we, ALEXANDER MC-KECHNIE, of the firm of McKechnie Brothers, of Rotton Park street, Birmingham, England, copper-smelters, and FREDRIC GEORGE BEASLEY, of 44 Green street, Smethwick, near Birmingham, England, chemical engineer, both subjects of the King of Great Britain, have invented a certain new and useful Improved Method of Separating Metallic Compounds, of which the following is a specification.

This invention has relation to methods or processes of extracting and separating metallic compounds from complex ores and mattes (raw or calcined) and metalliferous residues and substances and alloys, and is principally applicable to the treatment of such substances as contain iron in association with a more valuable non-ferrous metal or metals such as zinc, lead, copper, nickel, cobalt, tin, antimony, or silver, and the principal object of the said invention is to effect, in a rapid, economical and practical manner, and upon a commercial scale, the clear separation of the extracted non-ferrous metal or metals from the iron, and also from the gangue or other silicious or insoluble constituents of ore, mattes and residues, for the purpose of obtaining solutions of non-ferrous metals absolutely free from iron.

Another object, as applied to the treatment of substances containing two or more non-ferrous metals, is to effect—in addition to the complete exclusion of iron—the sharp or clearly-defined selective separation of such non-ferrous metals from one another, in the order of their chemical affinity for the solvent employed.

To attain the first-mentioned object we propose to treat the ore or other substance, in a pressure vessel, with an ascertained suitable quantity of acid solvent (such as hydrochloric or sulfuric acid or ferrous sulfate or chlorid) sufficient to dissolve out either the whole of the non-ferrous metal or metals present, or one only of the said metals, and simultaneously to subject the contents of the vessel to the oxidizing action of air under the combined influences of high temperature and high pressure, when owing to the reactions set up by the air blown in and the iron present in the treated substance, the solvent acts selectively upon the non-ferrous metal or metals to form a non-ferrous solution from which iron is completely excluded. This result can be realized only by working with acid solvents and oxidizing air under the above-mentioned conditions, since it will be understood that in the case (for example) of an ore containing iron as sulfid being merely treated with acid solvent under the influences of pressure and heat alone, no degree of heat or pressure, however high, would insure the selective extraction of the non-ferrous metals or prevent the formation of soluble iron salts. But by subjecting the contents of the vessel to the action of air during the treatment of the ore or the like with acid solvent under high temperature and pressure (attained by forcing steam with the air into the said vessel) the tendency of the acid to preferentially attack the iron compound and permanently form a soluble iron salt is counter-acted or neutralized, as the air oxidation converts all the iron into insoluble oxid and precipitates the same, so that the acid can only take into solution the non-ferrous compounds present. In other words, it is obvious that on hydrochloric or sulfuric acid being added to an ore containing iron sulfid, the first result is to form the corresponding ferrous salt but the action of the air under the working conditions described immediately oxidizes the ferrous into ferric salt which re-acts with the non-ferrous compounds (such as oxids or sulfids) in the ore to form soluble non-ferrous salt or salts while all iron present is precipitated as ferric oxid or hydrate. In like manner, when a ferrous salt, such as chlorid or sulfate, is used as the solvent agent instead of acid, similar re-actions occur and the same sharp selective separation is attained, as by the oxidizing action of the air under the high temperature and pressure conditions, the ferrous salt is converted into the ferric state and re-acts with the non-ferrous compounds to produce a solution free from iron, since the re-actions brought about by the air compel the precipitation of the iron in the added salt as well as any iron that may be dissolved out of the ore or the like.

In working the process for treating substances containing one or more non-ferrous metals in association with iron to extract and separate the whole of the said non-ferrous metal or metals in one solution, the said substance (if an ore or matte or the like) is first crushed or otherwise reduced to a finely-divided state, mixed with a suitable quantity of water to form a mud, and charged into a pressure vessel. Or if an alloy is to be dealt with, it is placed in the pressure vessel in the form of shot, shavings, ribbons or the like and covered with water or mother liquor. Then (the approximate proportions of the non-ferrous metal or metals present being known or having been previously ascertained) the charge is treated with a quantity of solvent, such as sulfuric or hydrochloric acid or the ferrous salts of such acids, sufficient only to convert the said non-ferrous metal or metals into soluble compounds. And where a ferrous salt is used, it is of course understood that in calculating the quantity required for the treatment of a given ore or substance, it is the quantity of acid equivalent present in the said salt that has to be taken into account. Then the pressure-vessel is closed and the contents are subjected, for a suitable period, to treatment with air and high-pressure steam. The air and steam may either be blown into the vessel simultaneously or separately: or air only may be blown in while steam is generated internally or from the liquid contents of the vessel by heating the latter externally. This method of working results in the sharp selective extraction and separation of the non-ferrous constituents of the ore or the like by virtue of the reactions already described. And the non-ferrous solution thus obtained, after being filtered or otherwise mechanically separated from the iron precipitate and the insoluble residues, may be treated by any well-known or suitable methods for precipitating or fractionally separating the non-ferrous metals from one another.

By means of the steam and pressure treatment, the contents of the pressure vessel can be readily raised to any temperature above 212° Fahrenheit, and the working temperature and pressure can be readily varied according to the nature of the substances to be dealt with, but it may be stated, by way of example, that in treating ores or residues containing iron with copper and zinc, good results as regards the clearly-defined and complete separation of all the iron in the ferric state can be obtained by working with oxidizing air under a temperature of about 338° Fahrenheit and a pressure of about 100 lbs. to the square inch.

In a variation of the process where the ore or substance to be treated contains two or more non-ferrous metals, the selective extraction and separation of the said non-ferrous metals one-by-one and in the order of their chemical affinity for the solvent is effected by adding to the charge of ore or the like in the pressure vessel, only a sufficient quantity of acid solvent, or ferrous salt, sufficient to form a solution of one of non-ferrous compounds present in the charge. Then by treating the contents of the vessel with air under high temperature and pressure conditions attained in the manner already stated, not only are the necessary reactions brought about for effectively excluding iron from the resultant solution, but the solvent is compelled to exercise a sharp selection in forming a soluble salt of the non-ferrous constituent that has the greatest chemical affinity for the acid. On the completion of the selective extraction of the first non-ferrous metal, its solution is drawn off from the pressure-vessel and thereby separated from the remaining undissolved non-ferrous metal or metals as well as from the precipitated iron and the insoluble gangue or the like, after which the operation is repeated with the aid of another quantity of solvent to dissolve out the non-ferrous metal next in order of affinity; and so on until the whole of the non-ferrous metals required have been individually separated.

Where ferrous salt is used as the solvent, then the process may be applied to the treatment of substances containing only compounds of non-ferrous metals, since the iron contained in the said solvent, under the conditions of working with air, heat and pressure as described, produces the same re-action and insures the same sharp selective action of the solvent as is obtained when iron is present in the substance being treated.

We claim—

1. A method of separating non-ferrous metals from ores and other substances containing them, by the aid of iron, which consists in treating the substance in a pressure vessel with a solvent to dissolve out the non-ferrous metals, and subjecting the contents of the vessel to the oxidizing action of air under the combined influences of high temperature and high pressure, the ferrous iron being converted into a ferric state and precipitated.

2. A method of separating non-ferrous metal or metals from iron in ores and other substances containing the same which consists in treating such ore or substance in a pressure vessel with a suitable quantity of a solvent sufficient to dissolve out only the non-ferrous metal or metals, and simultaneously subjecting the contents of the vessel to the oxidizing action of air under the combined influences of high temperature and high pressure.

3. A method of separating non-ferrous metals from substances containing them which consists in treating the mass with a solvent containing a ferrous salt and in a quantity sufficient to dissolve out such non-ferrous metal or metals, and simultaneously subjecting the substance to the oxidizing action of air under the combined influences of high temperature and high pressure.

4. A method of extracting and separating the non-ferrous constituents from ores and other substances containing two or more non-ferrous metals by the aid of iron which consists in individually extracting and separating such non-ferrous metals in the order of their affinity for the solvent employed by successively treating the ore or substance with quantities of a solvent sufficient to form a solution of one only of the non-ferrous metals present and drawing off each solution thus formed, and simultaneously subjecting the ore or substance to the oxidizing action of air and to the influences of high temperature and pressure to insure the selective action of the solvent and the exclusion of iron from each solution.

In testimony whereof we have hereunto set our hands in presence of two subscribing witnesses.

ALEXANDER McKECHNIE.
FREDRIC GEORGE BEASLEY.

Witnesses:
  HY. SKERRETT,
  ARTHUR SADLER.